(12) United States Patent
Yu et al.

(10) Patent No.: US 10,501,347 B2
(45) Date of Patent: Dec. 10, 2019

(54) CATALYTIC OXIDATION OF AQUEOUS ORGANIC CONTAMINANTS

(71) Applicant: Hamilton Sundstrand Space Systems International, Inc., Windsor Locks, CT (US)

(72) Inventors: Ping Yu, West Hartford, CT (US); Timothy A. Nalette, West Stafford, CT (US)

(73) Assignee: HAMILTON SUNDSTRAND SPACE SYSTEMS INTERNATIONAL, INC., Windsor Locks, CT (US)

( * ) Notice: Subject to any disclaimer, the term of this patent is extended or adjusted under 35 U.S.C. 154(b) by 676 days.

(21) Appl. No.: 14/954,153

(22) Filed: Nov. 30, 2015

(65) Prior Publication Data

US 2017/0152166 A1 Jun. 1, 2017

(51) Int. Cl.
*B01J 23/40* (2006.01)
*B01J 23/46* (2006.01)
(Continued)

(52) U.S. Cl.
CPC ............ *C02F 1/725* (2013.01); *B01J 23/462* (2013.01); *B01J 35/0006* (2013.01);
(Continued)

(58) Field of Classification Search
CPC .. B01J 23/462; B01J 35/0006; B01J 35/1057; B01J 35/1061; B01J 35/1066; B01J 35/1071; B01J 23/40; B01J 35/109; B01J 37/0201; B01J 37/0236; B01J 37/088; B01J 37/10; B01J 37/18; C02F 1/02; C02F 1/20; C02F 1/725; C02F 11/06; C02F 11/08; C02F 11/10; C02F 11/18; C02F 2101/30; C02F 1/283; C02F 1/42; C02F 1/50; C02F 1/722; C02F 1/727; C02F 1/74; C02F 1/76; C02F 2101/34; C02F 2101/40
See application file for complete search history.

(56) References Cited

U.S. PATENT DOCUMENTS 4,051,073 A * 9/1977 Hegedus .................. B01J 23/40
423/213.2
5,338,463 A * 8/1994 Yan .......................... C02F 1/281
210/763

(Continued)

OTHER PUBLICATIONS

Perry et al., "Perry's Chemcial Engineers' Handbook," Seventh Ed., 1997, sec. 7-7. (Year: 1997).*

*Primary Examiner* — Lucas A Stelling
(74) *Attorney, Agent, or Firm* — Cantor Colburn LLP

(57) ABSTRACT

A method of treating water to oxidize organic contaminants comprises heat transfer system includes heating liquid water to a temperature of at least 190° F. at a pressure to keep the heated water in a liquid phase, and contacting the heated water with oxygen and an oxidation catalyst including a noble metal on a porous support comprising a bi-modal pore size distribution including pore sizes from 1 nm to 20 nm and pore sizes from 100 nm to 1000 nm. The resulting catalytic oxidation of the organic contaminants results in the release of gaseous reaction products resulting from the oxidation reaction, which are separated from the treated water in a phase separator to produce a treated water final product.

20 Claims, 4 Drawing Sheets

(51) Int. Cl.
  B01J 35/10    (2006.01)
  B01J 37/02    (2006.01)
  B01J 37/10    (2006.01)
  B01J 37/18    (2006.01)
  C02F 1/02     (2006.01)
  C02F 1/28     (2006.01)
  C02F 1/42     (2006.01)
  C02F 1/50     (2006.01)
  C02F 1/72     (2006.01)
  C02F 1/74     (2006.01)
  C02F 1/76     (2006.01)
  B01J 35/00    (2006.01)
  B01J 37/08    (2006.01)
  C02F 1/20     (2006.01)
  C02F 101/30   (2006.01)
  C02F 101/34   (2006.01)

(52) U.S. Cl.
  CPC ......... *B01J 35/109* (2013.01); *B01J 35/1057* (2013.01); *B01J 35/1061* (2013.01); *B01J 35/1066* (2013.01); *B01J 35/1071* (2013.01); *B01J 37/0201* (2013.01); *B01J 37/0236* (2013.01); *B01J 37/088* (2013.01); *B01J 37/10* (2013.01); *B01J 37/18* (2013.01); *C02F 1/02* (2013.01); *B01J 23/40* (2013.01); *C02F 1/20* (2013.01); *C02F 1/283* (2013.01); *C02F 1/42* (2013.01); *C02F 1/50* (2013.01); *C02F 1/722* (2013.01); *C02F 1/727* (2013.01); *C02F 1/74* (2013.01); *C02F 1/76* (2013.01); *C02F 2101/30* (2013.01); *C02F 2101/34* (2013.01); *C02F 2101/40* (2013.01)

(56) References Cited

U.S. PATENT DOCUMENTS

| | | |
|---|---|---|
| 5,460,792 A | 10/1995 | Rosenbaum |
| 7,060,236 B2 | 6/2006 | Yan et al. |
| 7,202,195 B2 | 4/2007 | Cannon et al. |
| 7,614,506 B2 | 11/2009 | Mitchell et al. |
| 8,119,012 B2 | 2/2012 | Bahm et al. |
| 8,691,177 B2 | 4/2014 | Pfeifer et al. |
| 2005/0107479 A1* | 5/2005 | Espinoza ............... B01J 21/12 518/718 |
| 2014/0302981 A1 | 10/2014 | Bohringer et al. |
| 2015/0093310 A1 | 4/2015 | Bohringer et al. |

* cited by examiner

CATALYTIC OXIDATION OF AQUEOUS ORGANIC CONTAMINANTS

This invention was made with government support under Contract No. NNM14AA16C awarded by NASA. The government has certain rights in this invention.

BACKGROUND

This disclosure relates to a method and system for removing low concentrations of organic contaminants from water streams.

Water often has to be purified before it can be consumed as potable water or used for other purposes requiring removal of contaminants. Organic compounds are a common source of contaminants in water. For example, ground or surface water can be polluted by discharges from industrial processes, accidental spills, or sewer system overflow. Water condensed from closed atmospheres or recycled from aqueous waste streams, such as those found in spacecraft, can contain organic compounds that have to be removed to make the water potable, especially in a closed environment like a spacecraft in which it is desirable to recycle all water.

Organic compounds having relatively large molecular structures (e.g., $C_4$ and larger) are relatively easy to remove from water by conventional methods such as adsorption or ion exchange. These removal methods, however, tend to leave low concentrations of organic compounds, especially low molecular weight compounds, in the water. Low molecular weight organic compounds can be difficult to remove from water streams, particularly those compounds that do not readily ionize. In addition, such compounds are not easy to remove with physical sorbents like activated charcoals, zeolites, or other high surface area sorbents. Oxidative processes can remove aqueous organic contaminants, but many such known processes can have drawbacks such as large physical system footprints, long processing times, high power consumption, requirements for consumables, as well as other performance or reliability issues.

Processes for oxidation treatment of contaminated water, known as wet air oxidation, are described in U.S. Pat. No. 2,665,249 to Zimmermann and U.S. Pat. No. 3,133,016 to Stine et al. The Zimmermann process requires temperatures of at least 450° F. and the Stine process requires temperatures between 200° F. and 600° F. and elevated pressures. Although both processes are capable of reducing the total organic carbon (TOC) content of contaminated water, they are incapable of removing some low molecular weight organic compounds, especially acetic acid. Moreover, the processes are energy intensive and require reactors constructed from materials like titanium to withstand corrosive operating conditions. Supercritical water oxidation is capable of converting aqueous organics, including acetic acid, to their elemental oxides. The process requires temperatures between 750° F. and 1200° F. and pressures between 3200 psig and 4000 psig. These high temperatures and pressures require vessels made with thick walls and costly alloys. As a result, the components of a supercritical water oxidation system are heavy and power consumption is high. Photochemical processes that make use of UV light and a chemical oxidant or a photocatalyst can also convert aqueous organics to their elemental oxides. However, these processes tend to have low conversions and require recycling to obtain complete oxidation of the organic contaminants. Additionally, photocatalysts such as $TiO_2$ are subject to deactivation caused by oxidation of airborne silicone contaminants that oxidize to form silicon-containing deposits on the photocatalyst. U.S. Pat. No. 5,234,584 to Birbara et al. discloses a process and catalyst for oxidation treatment of water for removal of organic contaminants. However, Birbara also requires temperatures of at least 250° F., which not only requires energy for heating the water to such temperatures, but also requires energy and equipment to pressurize the water to at least 65 psia in order to maintain the water below its boiling point.

BRIEF DESCRIPTION

In some aspects of this disclosure, a method of treating water to oxidize organic contaminants comprises heating liquid water to a temperature of at least 190° F. to at a pressure to keep the heated water in a liquid phase, and contacting the heated water with oxygen and an oxidation catalyst comprising a noble metal on a porous support comprising a bi-modal pore size distribution comprising pore sizes from 1 nm to 20 nm and pore sizes from 100 nm to 1000 nm. The resulting catalytic oxidation of the organic contaminants results in the release of gaseous reaction products resulting from the oxidation reaction. These gaseous reaction products are separated from the treated water in a phase separator to produce a treated water final product.

In some aspects of this disclosure, a system of treating water for organic contaminants comprises a heater having an inlet in fluid communication with a water source and an outlet, configured to heat liquid water to a temperature of at least 190° F. The system also includes a reactor comprising a reactor housing that has an inlet in fluid communication with the heater outlet and an outlet. The reactor housing defines a reactor enclosure within the housing, which has an oxidation catalyst therein comprising a noble metal on a porous support comprising a bi-modal pore size distribution comprising pore sizes from 1 nm to 20 nm and pore sizes from 100 nm to 1000 nm. The system also includes a gas-liquid phase separator having an inlet in fluid communication with the reactor outlet.

In some aspects of this disclosure, a catalyst for oxidizing aqueous organic contaminants comprises a porous support comprising a bimodal pore size distribution comprising pore sizes from 1 nm to 20 nm and pore sizes from 100 nm to 1000 nm, and from 5 wt. % to 25 wt. %, based on the total weight of the catalyst, of noble metal crystallites selected from 100 angstroms (Å) or smaller.

BRIEF DESCRIPTION OF THE DRAWINGS

The subject matter of the disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
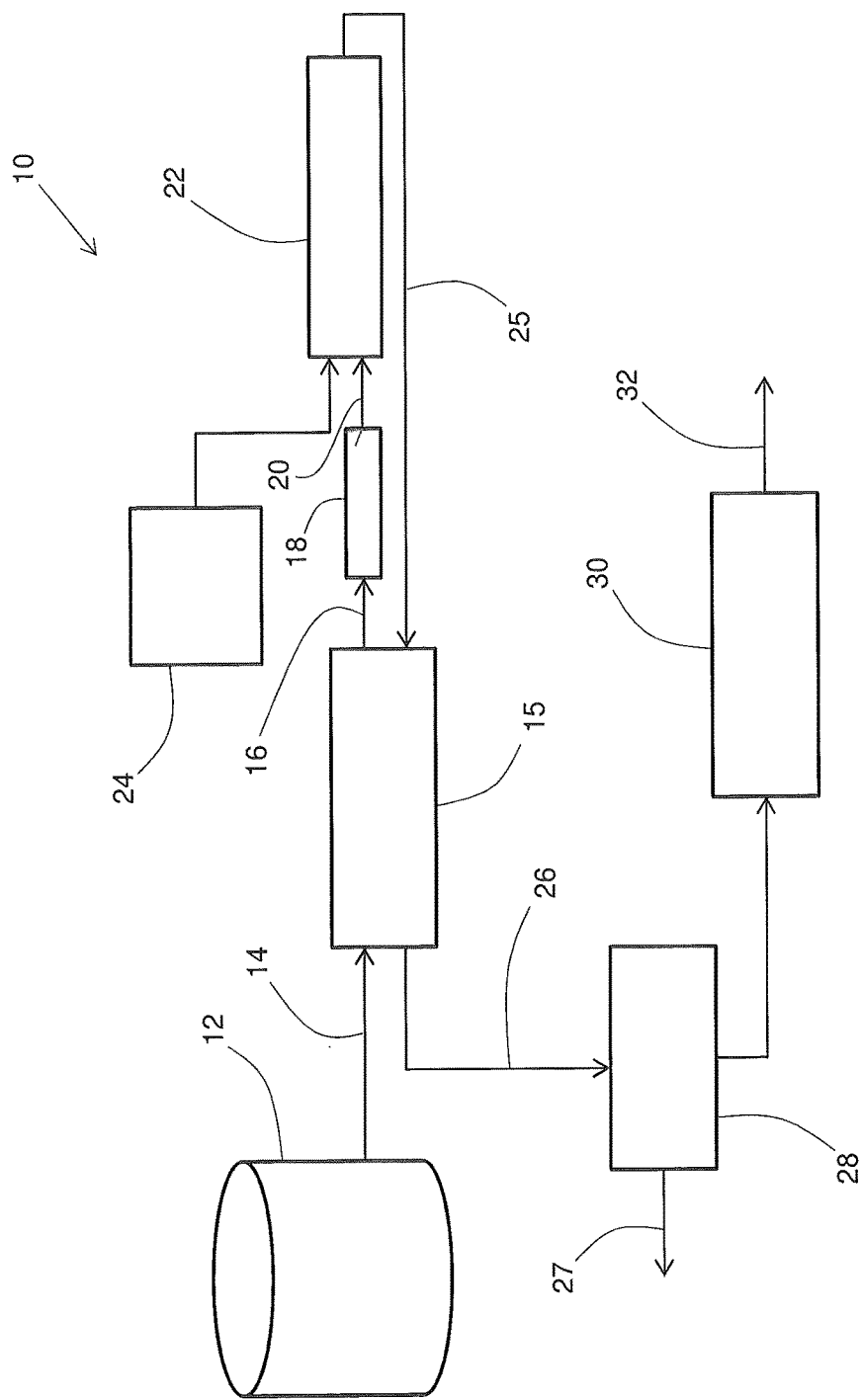
FIG. 1 is a schematic depiction of an exemplary system for catalytic oxidation treatment of water.

Referring now to the FIG. 1, an exemplary system and process for treating water is depicted and described further below. As schematically depicted in FIG. 1, in an exemplary system 10, water 14 from water source 12 to be treated for organic contaminants passes through a heat absorption side of heat exchanger 15 where the water is pre-heated. The pre-heated water 16 is directed to heater 18 where it is heated to a target temperature for catalytic oxidation of organic contaminants. Unlike prior systems, which required heating to 250° F. or higher, the system described in this disclosure does not require the water temperature to be over 250° F. The technical effect of this temperature range is that the water can be maintained in a liquid state without the need the need to pressurize it above atmospheric pressure. Keeping the water in the liquid phase helps minimize the reactor volume and maintains a good flow distribution though the catalyst bed. In some exemplary embodiments, the water is heated to a temperature in a range having an upper limit of 250° F., and more specifically 230° F. In some exemplary embodiments, the temperature range has a lower limit of 190° F., and more specifically 200° F., it being understood that the aforementioned upper and lower temperature limits can be independently combined.

Heated water 20 is directed from heater 18 to reactor 22 for catalytic oxidation of organic contaminants. Reactor 22 has a reactor housing that defines a reactor space inside the housing (not shown), and has an oxidation catalyst (not shown) disposed in the reactor space. The heated water is contacted with oxygen from an oxygen source 24, which can be added to the reactor or can be added to the water before it enters the reactor. The water can be aspirated or bubbled with compressed oxygen or air, or gaseous oxygen can be generated in situ (e.g., from electrolysis) or from ozone, but the oxygen source can also be a liquid such as hydrogen peroxide. The oxygen source should be added in an amount sufficient to provide at least a stoichiometric amount of oxygen relative to the contaminants to be oxidized. In some embodiments, enough of the oxygen source is mixed with the contaminated water to provide about 10% to about 50% excess oxygen, although more oxygen may be appropriate to oxidize especially refractory contaminants or if oxygen source consumption is not a design limitation.

The oxygenated water is contacted inside the reactor 22 with a catalyst bed containing the oxidation catalyst. The flow rate of the water and the volume of the catalyst bed can be set to achieve a residence time of the water in contact with the catalyst bed. The residence time can range from about 5 minutes and above, more specifically about 10 minutes and above. The catalyst promotes oxidation of oxidizable compounds to produce reaction products plus purified water. The reaction products can include, carbon dioxide, water, nitrogen, $SO_2$, and other compounds, depending on the contaminants present in the water. The carbon dioxide and nitrogen are generally in the gas phase, although some of the carbon dioxide may dissolve in the water to form carbonate ions. The $SO_2$ is typically dissolved in the water.

After contacting the catalyst bed in the reactor 22, the purified water stream 25 is directed to a heat rejection side of heat exchanger 14, where it rejects heat to pre-heat the water being fed to the reactor. Gaseous reaction products 27 such as carbon dioxide and nitrogen and any unreacted oxygen are then separated from the cooled water 26 in a phase separator 28 and the purified water is optionally passed through a series of polishing beds 30 to remove any residual contaminants to produce the finished water 32. The polishing beds can be configured to remove any residual contaminants such large organic molecules that were not fully were not oxidized, dissolved reaction product gases such as $NO_2$, $SO_2$, and $CO_2$, or ionic organic compounds such as acetate ions. Polishing beds can contain conventional anionic and cationic ion exchange resins and physical-type sorbents such as activated carbon. In addition to removing any residual contaminants remaining in the water, the polishing beds can add chlorine or other biocide to the water.

The oxidation catalyst can be used to oxidize a wide variety of organic compounds and compounds containing nitrogen and sulfur. The compounds that can be oxidized include alcohols, organic acids, aldehydes, ketones, ethers, aliphatics, aromatics, amines, ammonia, amides, and other organic compounds, including nitrogen- and sulfur-containing organic compounds. For example, the catalyst can be used to oxidize compounds such as methyl alcohol, ethyl alcohol, isopropyl alcohol, benzyl alcohol, phenol, ethyl ether, formic acid, acetic acid, benzoic acid, propionic acid, lactic acid, acetone, acetaldehyde, formamide, thiourea, ammonia, urea, and trichloroethylene. In general, the catalyst will oxidize any oxidizable organic compound as long as sufficient oxygen is available for the reaction, a sufficient residence time is provided, and the reactants are at an appropriate temperature. Studies of the oxidation mechanism indicate that most organics are oxidized in a sequential manner. For example, alcohols are oxidized to organic acids, which in turn are oxidized to carbon dioxide and water. Similarly, aldehydes and ketones form organic acids before complete oxidation to carbon dioxide and water. The oxidation of oxygenated organics such as sugars, starches, alcohols, ketones, aldehydes, and acids is facilitated by the presence of oxygen in the molecule. The catalyst can also oxidize nitrogen-containing compounds, such as ammonia, amines, and amides, to nitrogen without the formation of nitrogen oxides. This phenomenon is primarily attributable to the relatively low temperatures at which these compounds oxidize in the presence of the catalyst. The production of nitrogen rather than nitrogen oxides is desirable because the oxidation reaction consumes less oxidant and there is no need for ion exchange resins to remove nitrogen oxides.

The catalyst includes a noble metal capable of catalyzing the oxidation of organic contaminants. Exemplary noble metals include platinum, palladium, ruthenium, iridium, or combinations comprising any of the foregoing. In some exemplary embodiments, the noble metal comprises platinum. In some embodiments, the noble metal is in the form of crystallites of 100 Å or smaller. The noble metal can be present in an amount of about 5 wt. % to about 25 wt. %, more specifically about 10 wt. % to about 20 wt. %, noble metal crystallites, based on the total weight of the catalyst including the noble metal and the support. The crystallites should be uniformly distributed on the surface of the catalyst support.

Examples of catalyst supports include activated carbon or a ceramic such as ceria or alumina. Exemplary ceramic support materials can have a surface area of at least about 50 $m^2/g$, more specifically at least about 100 $m^2/g$. Exemplary activated carbon support materials can have a surface area of at least about 500 $m^2/g$, more specifically at least about 1000 $m^2/g$. Exemplary support materials can have an average size of about 4 mesh to about 40 mesh and can be in a granular form. Similarly sized support material in tabular, spherical, or extrudate forms can also be used. Depending on the application, larger or smaller support material can also be suitable. Suitable ceramic support materials include ceria, alumina, magnesia, zirconia, silica, and mixtures comprising any of the foregoing and are commercially available. In some exemplary embodiments, the support can be activated carbon granules having an average size of about 14 mesh to about 20 mesh, a surface area of about 100 $m^2/g$ or greater, a nominal density of at least about 27 pounds per cubic foot (lb/ft$^3$), and an Iodine Number of about 1000 mg/g or greater.

Figure 2:
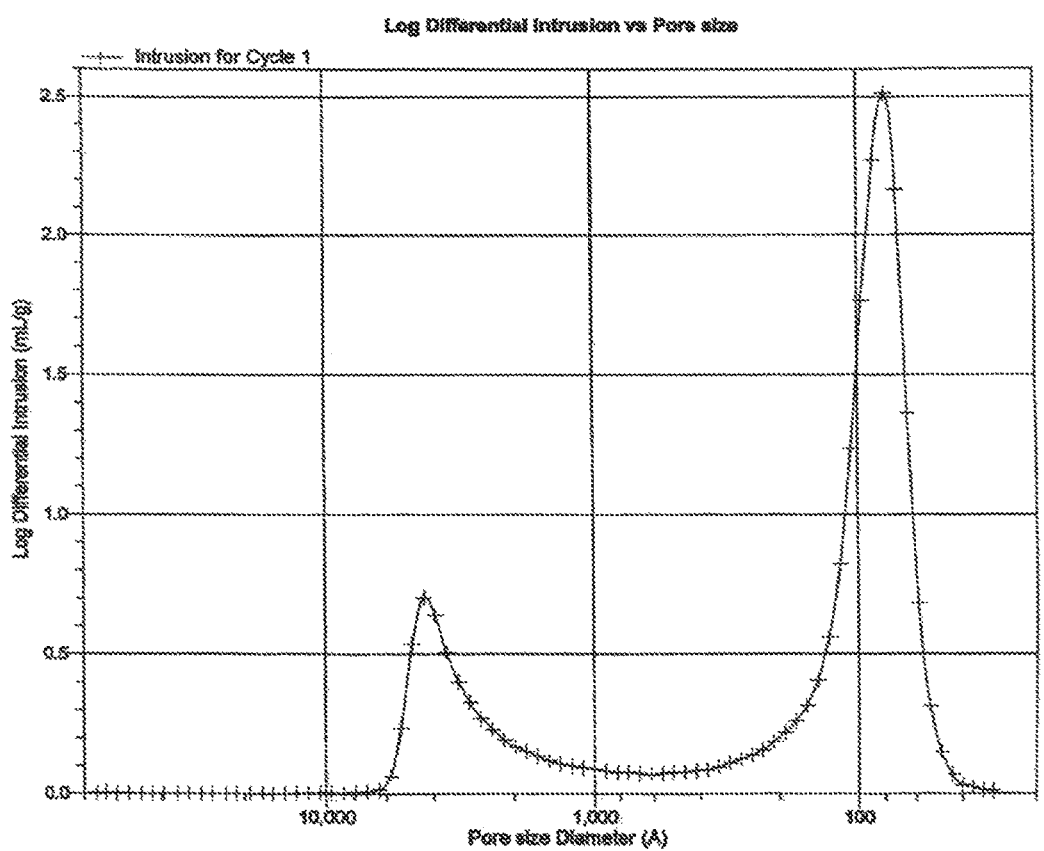
FIG. 2 depicts a bimodal pore size distribution of a first exemplary supported catalyst.
Figure 3:
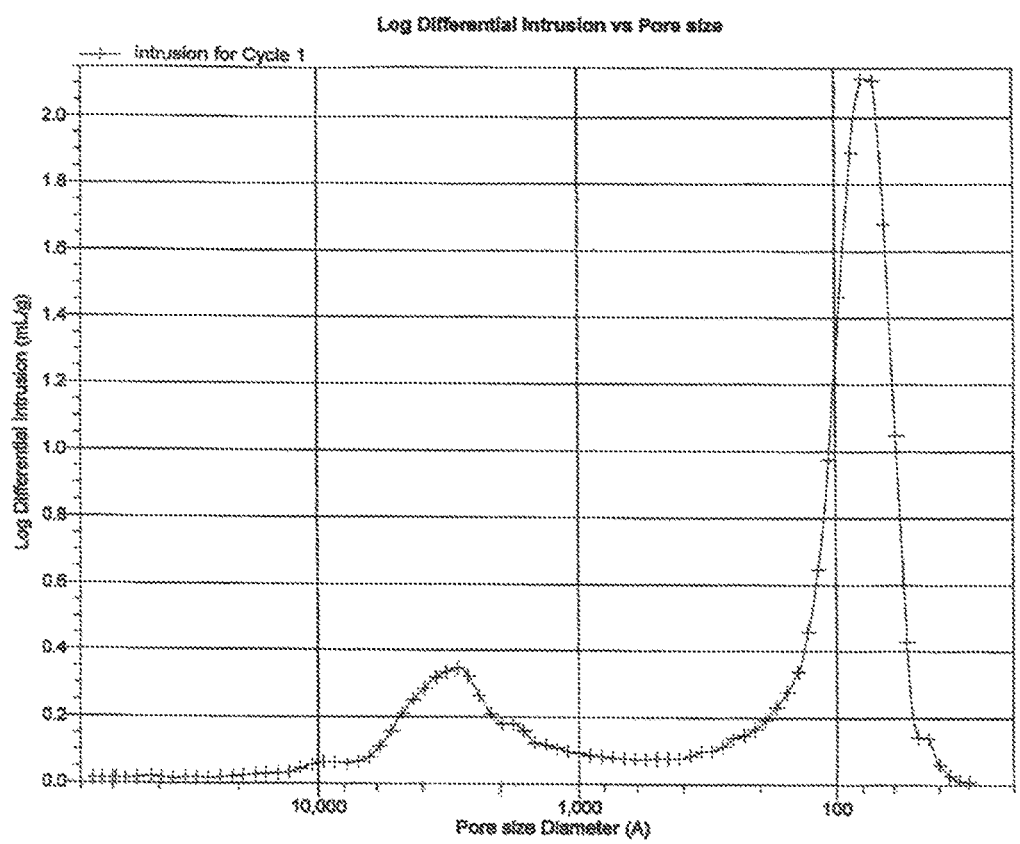
FIG. 3 depicts a bimodal pore size distribution of a second exemplary supported catalyst.
Figure 4:
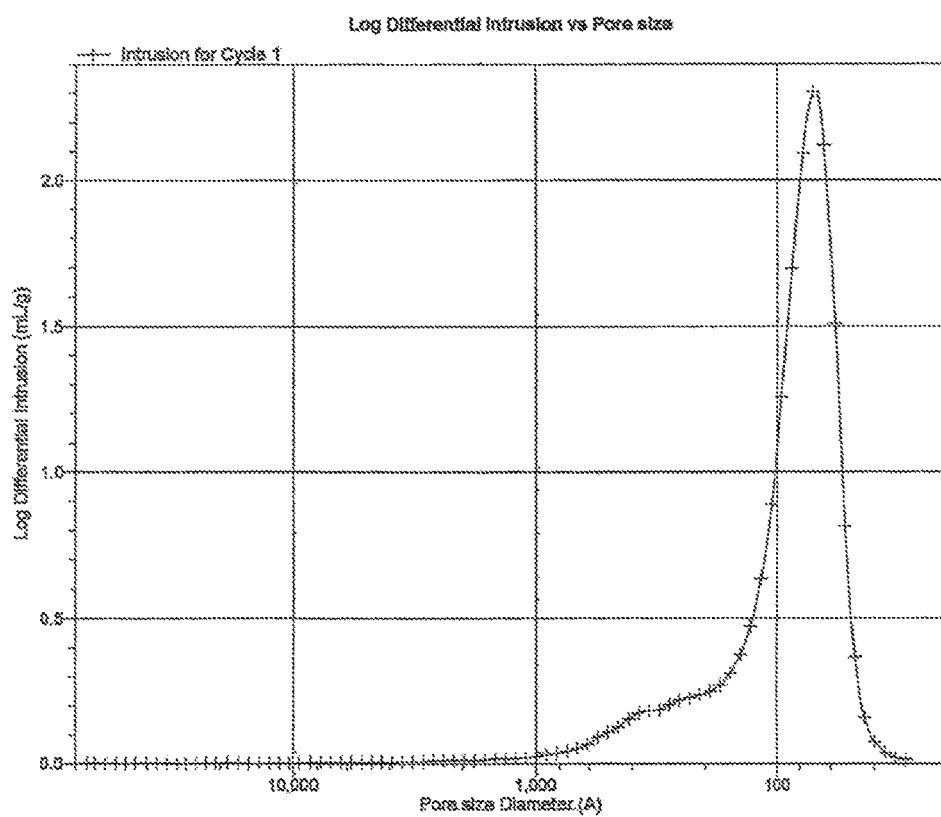
FIG. 4 depicts a single pore size distribution of a comparative exemplary supported catalyst.

As mentioned above, the catalyst support comprises a bimodal pore size distribution comprising pore sizes from 1 nm to 20 nm and pore sizes from 100 nm to 1000 nm. Pore size distributions of exemplary supported catalysts are shown in FIGS. 2, 3, and 4, with the pore size distribution determined with mercury intrusion porosimetry analysis. As used herein, a bimodal pore size distribution means that the material has a pore size distribution that will yield two distinct peaks on a plot of log differential intrusion versus pore size according to ASTM D4284-12 using the AutoPore IV 9500 instrument from Micromeritics Instrument Corporation. As shown in the exemplary embodiments of FIGS. 2 and 3, the first peak falls in the range of 1 nm to 20 nm and a second peak falls in the range of 100 nm to 1000 nm. More specifically, the first peak can fall in the range of 5 nm to 20 nm and a second peak can fall in the range of 200 nm to 600 nm. A single mode pore distribution means only one distinguished peak on a plot of log differential intrusion vs. pore size, as shown in FIG. 4, with the single peak falling in the range of 1 nm to 20 nm. In some aspects, percentages of pore volume for the pore from 100 nm to 1000 nm can range from 5% to 50%, with pore volume percentage pores from 1 nm to 20 nm ranging from 95% to 50%. In some aspects, percentages of pore volume for the pore from 100 nm to 1000 nm can range from 20% to 30%, with pore volume percentage pores from 1 nm to 20 nm ranging from 80% to 70%. For the bimodal supported catalysts shown in Table 1, pore volume percentage for 100 to 1000 nm pores are between 21-28%, compared to 0% in the single modal support catalyst.

TABLE 1

Pore Volumes of the Catalyst Supports

| Catalyst | Volume Percentage of Pores between 100 nm-1000 nm |
|---|---|
| FIG. 2 | 28.66% |
| FIG. 3 | 21.96% |
| FIG. 4 | 0 |

Pore size for ceramic supports can be manipulated by controlling conditions under which the ceramic is precipitated. For example, in a sol-gel reaction, the incorporation of a template polymer such as a polyalkylene oxide and optionally additives to help orient the polymer in solution can lead to formation of pore structures as metal oxide precursors in the sol undergo polycondensation around the polymer to form ceramic sub-nano-, nano-, or microstructures. The template polymer is removed during preparation of the ceramic powder by pyrolysis during calcination of the metal oxide. For carbon supports, which are typically formed by heat-carbonizing biological materials in the absence of oxygen followed by reaction of off-gases with oxygen or other agents, pore size distribution can be manipulated by selection and mixing of different types of biological materials for carbonizing as well as by variations on application and timing of various treatments such as steam treatment, reducing atmosphere treatment, oxidizing atmosphere treatment, and other techniques known in the art.

The catalyst can be disposed onto ceramic or carbon supports by impregnation or, in the case of some catalyst-ceramic combinations, by co-precipitation of the metal catalyst along with the ceramic support. Impregnation is typically carried out by impregnating the porous catalyst support with a solution of a salt of the noble metal, followed by evaporation of the solvent. Examples of aqueous solutions include chloro-platinic acid, ruthenium trichloride, and iridium tetrachloride. Evaporation can be performed under mixing with heat, vacuum, or a combination of both, for example in a rotary vacuum dryer.

After evaporation of the noble metal salt, the support material can be heated in an oxygen-containing atmosphere to convert a portion of the noble metal halide on the support material to a noble metal oxide. The conversion to a noble metal oxide can occur at temperatures of about 200° C. to about 300° C. in a humidified atmosphere. In some exemplary embodiments, at least 75%, in more specific embodiments at least 90%, of the noble metal halide is converted to a noble metal oxide. After cooling the support material, the deposition step can be repeated several times to deposit additional noble metal. For example, in some embodiments about 1 wt. % to about 10 wt. % noble metal, more specifically about 2 wt. % to about 5 wt. % noble metal can be deposited on the catalyst support during each deposition step.

After the desired amount of noble metal has been deposited onto the support material, the noble metal oxide and any remaining noble metal halide are reduced to noble metal crystallites. This can be accomplished by heating the material under a reducing atmosphere such as a humidified hydrogen-containing atmosphere. The reducing temperature can vary from about 250° C. to about 600° C. Reducing treatment times can vary from about 15 minutes to about 60 minutes.

After the catalyst is prepared, it can be conditioned to remove any inorganic and organic materials that might impair its reactivity. One way to condition a catalyst bed is to flush it with a warm deionized water, at about 150 to 200° F. The elevated temperature initiates and accelerates catalyst conditioning. In some embodiments, conditioning is considered complete when an ion chromatographic analysis of the reactor effluent shows halide concentrations of less than about 1 ppm.

Further description is provided in the following Examples.

Preparation 1

About 58 grams of 3 mm SA6275 alumina spheres (Saint-Gobain NorPro) were washed with 500 ml of distilled water and entrained dust were removed by decanting. Repeat washing for at least 3-4 times until a clear water is obtained. The wet pellets after washing were dried in an oven at 150° C. for 3 hours and then transferred to a 400 ml round bottom boiling flask to deposit ruthenium salt. About 70 grams of 20 wt % ruthenium trichloride solution (Johnson Matthey Corporation, NJ) were gradually added onto the alumina spheres. The flask was attached to a R-114 rotary evaporator (Buchi Labortechnik, Switzerland), placed in a water bath, and rotated at 30 rpm under vacuum until the sphere material was totally dried and tumbled freely. The dried material was treated at 250° C. in 50% nominal relative humidity air-purged oven for 2 hours to convert the ruthenium trichloride to ruthenium oxides. After cooling, the obtained material was loaded into a quartz tube for hydrogen reduction. After initial nitrogen purging, the quartz tube was gradually heated to 600° C. under flowing hydrogen of 3 L/min and held at that temperature for about 30 minutes. The final step of catalyst preparation was washing with warm deionized water and dried at 125° C. in air. The resulting catalyst, having a pore size distribution shown in FIG. 4, contained about 18.9 wt % ruthenium.

Preparation 2

A similar process to Preparation 1 was applied to preparation of a catalyst on SA6276 support (Saint-Gobain NorPro). The resulting catalyst having a pore size distribution shown in FIG. 3 contained about 20.5 wt % ruthenium.

Preparation 3

A similar process to Preparation 1 was applied to preparation of a catalyst on SA6176 support (Saint-Gobain NorPro). The resulting catalyst having a pore size distribution shown in FIG. 2 contained about 19.9 wt % ruthenium.

EXAMPLES

An aqueous solution containing 25 ppm ethyl alcohol and 15 ppm isopropyl alcohol was prepared to provide a contaminated water stream with a TOC (total organic content) of 40 ppm. The contaminated water solution was passed through a reactor containing a catalyst prepared according to Preparation 1 (i.e., FIG. 4), Preparation 2 (i.e., FIG. 3), or Preparation 3 (i.e., FIG. 2), with a residence time of 10 minutes. Each reactor was tested at three temperatures/pressures, i.e., 265° F./65 psig, 230° F./30 psig, and 200° F./0 psig at oxygen feed stream of 3 cm³/min. Effluents of the reactor were analyzed for TOC performances and their values are listed in Table 2.

TABLE 2

TOCs of Tested Catalysts at Different Temperatures/Pressures

| Catalyst | Test Conditions | | |
|---|---|---|---|
| | 265° C., 65 psig | 230° C., 30 psig | 200° C., 0 psig |
| Preparation 3 | 0.23 | 3.15 | 24.30 |
| Preparation 2 | 0.78 | 4.10 | 22.30 |
| Preparation 1 | 0.34 | 7.30 | 31.46 |

Both Preparation 3 and Preparation 2 catalysts on bimodal supports show lower TOCs than the Preparation 1 on single pore support at lower temperatures/pressures such as 230° F./30 psig, and 200° F./0 psig.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A method for treating water, comprising:
   heating liquid water comprising organic contaminants to a temperature of at least 190° F. at a pressure to keep the heated water in a liquid phase;
   oxidizing the organic contaminants by contacting the heated water with oxygen and an oxidation catalyst comprising a noble metal on a porous support comprising a bimodal pore size distribution comprising pore sizes from 1 nm to 20 nm and pore sizes from 200 nm to 600 nm; and
   separating gaseous reaction products and unreacted oxygen from the treated liquid water.

2. The method of claim 1, wherein the liquid water is heated to a temperature of 200° F. to 230° F.

3. The method of claim 1, wherein the contacting of the heated water with oxygen and the catalyst is performed in a continuous manner to by flowing the heated water through a reactor comprising the catalyst to achieve a residence time of at least 5 minutes.

4. The method of claim 1, wherein the heated water is at a pressure of 1 bar to 3 bar.

5. The method of claim 1, wherein the noble metal is selected from platinum, palladium, ruthenium, iridium, or mixtures comprising any of the foregoing.

6. The method of claim 5, wherein the oxidation catalyst comprises from 5 wt. % to 25 wt. % of noble metal crystallites 100 Å or smaller, based on the total weight of the oxidation catalyst.

7. The method of claim 6, wherein the porous support comprises a bimodal pore size distribution comprising a first pore size population from 5 nm to 20 nm and a second pore size population from 200 nm to 600 nm.

8. The method of claim 1, wherein the porous support is a ceramic or activated carbon.

9. The method of claim 8, wherein the porous support has a surface area of at least 50 m²/g if the support is ceramic, or has a surface area of at least 500 m²/g if the support is activated carbon.

10. The method of claim 1, wherein the porous support comprises a bimodal pore size distribution comprising a first pore size population from 5 nm to 20 nm and a second pore size population from 200 nm to 600 nm.

11. The method of claim 1, wherein the percentage of pore volume of the bimodal support in the pore range of 200 nm to 600 nm ranges from 5% to 50%, and the percentage of pore volume of the bimodal support in the pore range of 1 nm to 20 nm ranges from 95% to 50%.

12. The method of claim 1, wherein the percentage of pore volume of the bimodal support in the pore range of 200 nm to 600 nm ranges from 20% to 30%, and the percentage of pore volume of the bimodal support in the pore range of 1 nm to 20 nm ranges from 80% to 70%.

13. The method of claim 1, wherein the noble metal comprises platinum and ruthenium.

14. The method of claim 13, wherein the oxidation catalyst comprises from 5 wt. % to 25 wt. % of Pt/Ru metal crystallites 100 Å or smaller, based on the total weight of the oxidation catalyst.

15. The method of claim 1, wherein the organic contaminants are selected from alcohols, organic acids, aldehydes, ketones, ethers, aliphatics, aromatics, amines, and amides.

16. A system for treating water for organic contaminants, comprising:
   a heater having an inlet in fluid communication with a water source and an outlet, configured to heat liquid water to a temperature of at least 190° F.;
   a reactor comprising a reactor housing defining a reactor enclosure within the housing and having an inlet in fluid communication with the heater outlet, and an outlet, and an oxidation catalyst in the reactor enclosure comprising a noble metal on a porous support comprising a bi-modal distribution comprising pore sizes from 1 nm to 20 nm and pore sizes from 200 nm to 600 nm; and
   a gas-liquid phase separator having an inlet in fluid communication with the reactor outlet.

17. The system of claim 16, wherein the heater is configured to heat the liquid water to a temperature of 200° F. to 230° F.

18. The system of claim 16, further comprising a flow controller configured to provide a continuous flow of water to the reactor at a rate to achieve a reactor residence time of at least 5 minutes.

19. The system of claim 16, wherein the oxidation catalyst comprises from 5 wt. % to 25 wt. % of noble metal crystallites 100 Å or smaller, based on the total weight of the oxidation catalyst.

20. The system of claim 16, wherein the porous support is a ceramic with a surface area of at least 50 $m^2/g$ or activated carbon with a surface area of at least 500 $m^2/g$.

* * * * *